United States Patent [19]

Hove

[11] Patent Number: 4,899,365
[45] Date of Patent: Feb. 6, 1990

[54] APPARATUS AND METHOD FOR ADAPTIVE AMPLITUDE EQUALIZATION

[75] Inventor: Robert G. Hove, Bellevue, Wash.

[73] Assignee: The Boeing Company, Seattle, Wash.

[21] Appl. No.: 162,113

[22] Filed: Feb. 29, 1988

[51] Int. Cl.[4] ............................................. H04B 3/10
[52] U.S. Cl. ........................................ 375/13; 375/98; 333/18
[58] Field of Search ...................... 375/11, 13, 14, 103, 375/76, 98, 12, 60; 370/17, 74, 98; 333/18, 28 R

[56] References Cited

U.S. PATENT DOCUMENTS

| | | | |
|---|---|---|---|
| 3,731,199 | 5/1973 | Tazaki et al. | 375/98 |
| 4,606,043 | 8/1986 | Aprille, Jr. et al. | 333/18 |
| 4,615,037 | 9/1986 | Adler | 375/12 |
| 4,718,073 | 1/1988 | Takaoka | 333/18 |
| 4,768,204 | 8/1988 | Zeiss | 375/98 |
| 4,785,418 | 11/1988 | Pearce et al. | 375/98 |

Primary Examiner—Robert L. Griffin
Assistant Examiner—Marianne Huseman
Attorney, Agent, or Firm—Christensen, O'Connor, Johnson & Kindness

[57] ABSTRACT

Apparatus and method for amplitude equalization of a signal channel such as a telephone line that does not require adjustments at the customer's premises. The equalization circuit receives a plurality of alignment signals at predetermined frequencies from the signal channel, and measures the amplitude of each alignment signal. The amplitudes are used to determine analog and digital filter transfer function coefficients. Thereafter, input signals on the signal channel are filtered such that the combined amplitude response of the signal channel and filter is substantially flat over a designated frequency range.

26 Claims, 5 Drawing Sheets

APPARATUS AND METHOD FOR ADAPTIVE AMPLITUDE EQUALIZATION

FIELD OF THE INVENTION

The present invention relates to the amplitude equalization of signal channels such as telephone lines.

BACKGROUND OF THE INVENTION

It is often desirable for communication channels and various other signal transmission circuits to have a substantially constant or "flat" amplitude response over a particular passband. In the context of the present invention, the "amplitude response" of a communication channel such as a telephone line refers to the amplitude of the attenuation (or gain) of the channel as a function of frequency. Due to the non-ideal characteristics of the electronic components normally available for the design and implementation of signal transmission circuits, unacceptable variations in the amplitude response may be present over the passband. For example, a telephone line used for voice or data communication can commonly have more than 10 dB of variation over its desired passband of 300–3000 Hz, because of the inherent characteristics of the transmission lines.

The term "amplitude equalization" refers to the technique for producing a nearly flat frequency response over a designated passband. The standard telephone industry approach for performing amplitude equalization on a telephone line has been manual adjustment of a filter network on the channel termination card at the customer's facility. This task must be performed when the line is initially installed, when changes in the line are made, or when complaints about the quality of communications are made. Although this has generally been an acceptable procedure, it requires a skilled craftsperson at the customer's premises to make the adjustments, a time consuming and costly operation. Manual procedures of this type have also introduced the possibility of human error. While automatic amplitude equalization could in principle be performed using computers and complex iterative algorithms, such techniques would not be appropriate for a telephone line communication channel, because the means for performing the equalization must be self-contained on the channel termination circuit card.

Figure 3A:
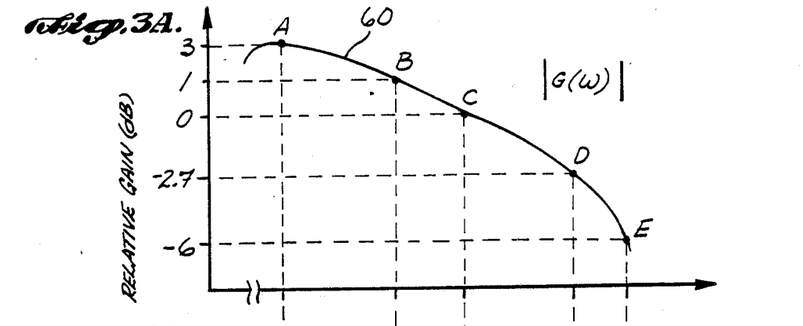
FIGS. 3A–3D are graphs showing the combination of the amplitude response of an unequalized channel with amplitude responses of the filter sections according to the present invention to produce a substantially flat amplitude response.

The amplitude response of a typical telephone line communication channel, such as the line used to connect an office telephone or data terminal to the central office of a telephone company, is shown in FIG. 3A. There is a wide variation in the specific shape of the response, due to variations in the length of a line, the wire size, the optional use of loading coils, and spur lines. However, in nearly every case of practical importance, the gain of the 300–3000 Hz channel is always highest at the low end and smallest near the high end.

Figure 1:
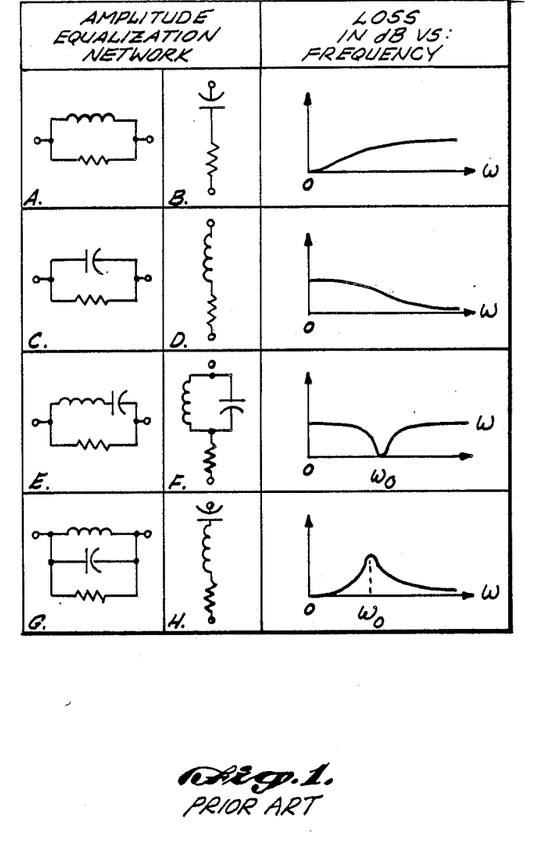
FIG. 1 is a table showing prior art amplitude equalization networks and their amplitude responses.

Presently used amplitude equalization networks for telephone line channels are shown in the table set forth in FIG. 1. For each row of the table, the first column shows a network that may be connected in series with the telephone line, the second column shows an equivalent network that may be connected in parallel with the telephone line, and the third column shows the shape of the amplitude response (attenuation or loss vs. frequency) of the networks in columns 1 and 2. These networks are manually installed and adjusted by a craftsperson. Usually two networks are used, one for the low frequency end of the channel, and the other for the high frequency end of the channel. Networks A-D are first order, having only one reactive component, networks E-H have two reactive components and are therefore second order networks. Networks E-H can therefore produce more accurate and sharply defined corrections.

Network B, C, G or H is typically used, along with a resistive load, to increase the loss at frequencies where the amplitude response is too high, i.e., between 300 and 1000 Hz. By installing one of these networks with suitable component values, a loss shape curve can be found that when added to the telephone channel response, results in an approximation of the desired flat amplitude response for frequencies below 1000 Hz. To equalize the upper part of the channel, between approximately 1000–3000 Hz, network F is presently in common use. This network is used as a shunt arm in the equalizer circuit where the signal is fed from a resistive source. Network E will produce similar results when used in the series arm of the circuit. The reactive components of these networks form a resonant circuit tuned to approximately 3000 Hz, where the amount of added loss required is a minimum. The craftsperson, when performing manual equalization, adjusts the value of the resistor. Assuming a constant signal source resistance, the value of the resistance determines the amount of loss variation.

SUMMARY OF THE INVENTION

The present invention provides an improved apparatus and method for performing amplitude equalization of a signal channel. As applied to a telephone system, the technique of the present invention permits equalization to be achieved by procedures carried out at the central office of a telephone system, and does not require adjustments by a skilled craftsperson at the customer's premises.

In a preferred embodiment, the invention provides a circuit for connection to a signal channel for adaptively amplitude equalizing the signal channel over a predetermined channel frequency range. The circuit comprises means for receiving a plurality of alignment signals from the signal channel, and means for measuring the amplitude of each alignment signal. Each alignment signal is at a predetermined alignment frequency. Filter data are then determined based upon the alignment signal amplitudes, and means are provided for storing the filter data. Thereafter, adaptive filter means filters an input signal present on the channel to produce a filtered output signal. The filter means adjusts its amplitude response in response to the filter data such that the combined amplitude response of the signal channel and the filter means is substantially flat over the channel frequency range.

In a preferred arrangement for application in a telephone system, the filter means comprises a plurality of adaptive filter sections, each filter section including means for producing a flat combined amplitude response over a subrange of frequencies that at least partially overlaps the channel frequency range. Preferably, each filter section has a biquadratic filter transfer function that includes coefficients that are determined such that the combined amplitude response of the signal channel and filter section has a predetermined value at three alignment frequencies. In this embodiment, the filter means preferably comprises digital filtering means, and the circuit includes means for receiving an analog signal from the signal channel and converting it into a corresponding series of digital signals that are input to the digital filtering means. In response, the digital filtering means produces a corresponding series of filtered digital signals that are converted into the filtered output signal. The filtering and equalization optionally can also be performed with adaptive analog filter functions and circuits without conversion to digital signals.

DETAILED DESCRIPTION OF THE INVENTION

Figure 2:
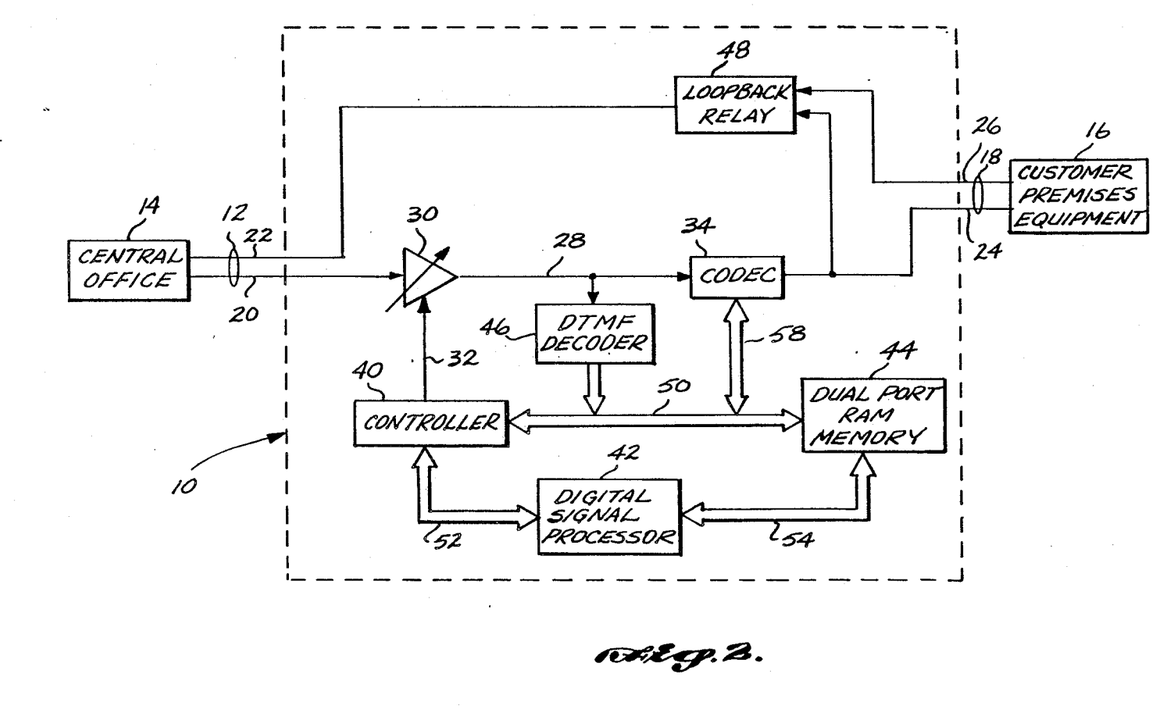
FIG. 2 is a block diagram of a circuit for performing amplitude equalization in accordance with the present invention.

FIG. 2 presents a block diagram of a preferred equalization circuit 10 for use in a telephone system. Equalization circuit 10 is inserted in two wire telephone line 12 that extends between central office 14 and customer premises equipment (CPE) 16. The equalization circuit is located at the CPE end of line 12, and compensates for variations in the amplitude response of line 12 between the central office and the equalization circuit. The equalization circuit is coupled to CPE 16 by line 18 that is assumed to be sufficiently short so as to not require equalization. Line 12 includes transmit line 20 for transmitting information from the central office to the customer premises, and receive line 22 for passing information from the customer premises back to the central office. Line 18 includes a similar transmit and receive pair 24 and 26, respectively.

Equalization circuit 10 includes variable gain amplifier 30 and codec 34 serially interposed between transmit lines 20 and 24. Equalization circuit 10 further comprises controller 40, digital signal processor 42, dual port RAM memory 44, DTMF decoder 46, and loopback relay 48. Loopback relay 48 connects line 24 or line 26 to receive line 22. The controller, the codec, the DTMF decoder, and the memory are interconnected via system bus 50. The digital signal processor 42 is connected to controller 40 via bus 52, and to memory 44 via bus 54. Equalization circuit 10 preferably forms a portion of a device known in the telephone industry as network channel terminating equipment (NCTE). In general, NCTE refers to equipment placed at a customer's premises for terminating trunks and special service lines, and is designed to insure proper voice frequency transmission and signaling on line 12 that connects the customer's premises with the network.

A signal received from central office 14 via line 20 is input to variable gain amplifier 30. The gain of this amplifier is set by a control signal received from controller 40 via line 32, in a manner more fully described below. The output of variable gain amplifier 30 on line 28 is input to codec 34 and DTMF decoder 46. Codec 34 comprises an analog to digital converter that converts the analog signal on line 28 into a sequence of digital samples, at a suitable sampling rate such as 8,000 Hz. The resulting digital signals are transferred to memory 44 via codec bus 58 and system bus 50. These digital samples are filtered by digital signal processor 42, as described below, and the resulting filtered digital values are stored in memory 44, and returned to codec 34 via buses 50 and 58. The returned digital values are converted by codec 34 into an analog signal on line 24 that is coupled to customer premises equipment 16.

Signals generated by customer premises equipment 16 travel via line 26 to equalization circuit 10, and are coupled to one input of loopback relay 48. During normal operation, the loopback relay couples this input to line 22, such that the signal from the customer premises equipment is returned to central office 14. However, in the loopback mode, described more fully below, loopback relay 48 switches under the control of a signal (not shown) provided by controller 40, such that the signal generated by codec 34 on line 24 is coupled to line 22, and returned to the central office.

The use of amplitude equalization circuit 10 comprises three principal steps. In the first step, central office 14 transmits a series of alignment signals to equalization circuit 10 at predetermined frequencies and at predetermined (e.g., constant) relative amplitudes. The equalization circuit means the received amplitudes of the alignment signals, and thereby determines line response data representing the actual amplitude response of line 12 at a plurality of frequencies. In a second step, equalization circuit 10 converts the line response data into digital filter coefficients for use by digital signal processor 42. Filter data representing the digital filter coefficients are stored in memory 44, which for this purpose may include electronically erasable PROM (EPROM) for the nonvolatile storage of such data. In a third step, the digital signal processor filters signals received from the central office via line 20 using the predetermined filter coefficients. The digital filtering compensates for the non-flat amplitude response of line 12, to produce a flat amplitude response for the combination of line 12 and equalization circuit 10 over the frequency range of interest. Analog equalization is an option since, as described below, the appropriate analog filter coefficients of the equalizer are also known at this point, since they are used to derive the digital filter coefficients.

Any suitable procedure can be used to implement the production of alignment signals by central office 14 for use by the equalization circuit. In one suitable arrangement, an operator at central office 14 sends a calibration command to equalization circuit 10 via line 12. The calibration command is sensed by DTMF decoder 46, and conveyed to controller 40 via bus 50. In response to the calibration command, the controller enters a calibration mode, in which it activates loopback relay 48 so as to couple line 22 to line 24, and then sends a series of test signals to central office 14 via the codec and loopback relay. Each test signal is a single frequency tone at a predetermined frequency, either in or near the nominal channel passband. Central office 14, upon receipt of each test tone, generates an alignment tone at the identical frequency and at a predefined amplitude level, and sends the alignment tone back to equalization circuit 10 via line 12. Equalization circuit 10 measures and stores the amplitude of the alignment tone to provide the desired line response data.

The operation of a particular preferred embodiment of the invention will now be described. Referring initially to FIG. 3A, graph 60 represents the amplitude response (gain versus frequency) of a typical telephone line in the frequency range of 300-3000 Hz. In general, for a given application, the overall frequency range over which equalization must occur can be divided into sections, with each section corresponding to a particular portion of the overall frequency range. A separate digital filter is then derived for each section, and the filters are applied in cascade by digital signal processor 42. For telephone applications, the use of two equalizer sections has been found to be most suitable for an application in which the tolerance range for the resultant amplitude response was 2 dB. The first section covers the range 300-1000 Hz, and the second section covers the range 1000-3000 Hz. Applications with a broader frequency range or smaller tolerances could use more than two sections, while a single section will suffice for other applications.

Figure 3B:
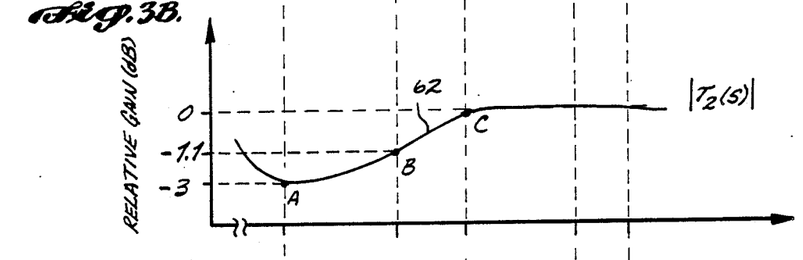
Figure 3C:
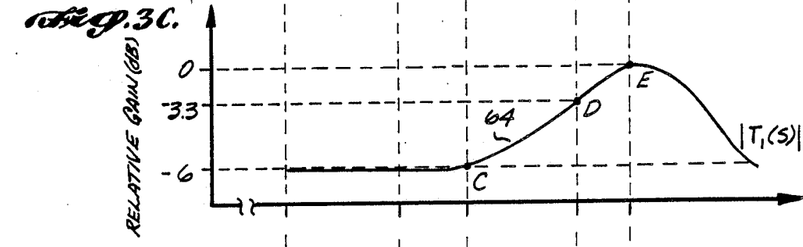
Figure 3D:
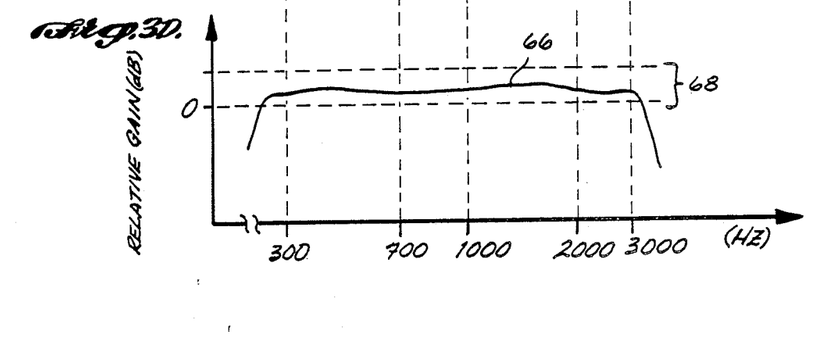

In accordance with the preferred embodiment, the amplitude response of the channel is determined at three frequency points per section. These points are labeled A, B, C, D and E in FIG. 3A, with point C being common to both sections. The frequencies of these points are 254 Hz, 504 Hz, 1014 Hz, 2054 Hz, and 3304 Hz, respectively. The exact frequency values used can be chosen with considerable latitude. Preferably, the gain at point C is set at a suitable level by means of the manual or automatic adjustment of variable gain amplifier 30, and point C thereafter serves as a reference (0dB) level for the filter design. A digital filter transfer function is then derived for each section. The frequency response of a filter corresponding to the first (low frequency) section is shown by graph 62 in FIG. 3B, while the frequency response of a filter corresponding to the second (high frequency) section is shown by graph 64 in FIG. 3C. The resultant amplitude response of the channel plus both filters is shown by graph 66 in FIG. 3D. In general, the filters are defined such that the resultant amplitude response falls within a specified tolerance 68.

In a preferred implementation, each digital filter section is assumed here to have an attenuation vs. frequency characteristic approximating that of an analog filter having a second order, biquadratic transfer function. Calculation of the analog transfer function of the high frequencies at points C, D and E will be designated $\omega_{ref}$, $\omega_1$ and $\omega_0$, respectively, and the unequalized amplitude (gain) response of the telephone line is designated $G(\omega)$, and is illustrated by graph 60 in FIG. 4A. The gain response of the analog filter transfer function for the high frequency section is designated $T_1(s)$, with s being the normalized complex frequency $j\omega/\omega_0$. $T_1(s)$ is illustrated by graph 64 in FIG. 4B. On the assumption of a resistive signal source, the biquadratic transfer function $T_1(s)$ can be written as follows:

$$T_1(s) = K \cdot \frac{s^2 + As + 1}{s^2 + Bs + 1} \quad (1)$$

and the condition for equalization is that
$$|T_1(s)| \cdot |G(\omega)| = \text{constant} \quad (2)$$

at $\omega_{ref}$, $\omega_1$ and $\omega_0$. If $\omega hd 2$ is defined as $\omega_0^2/\omega_1$, and if $\omega_c$ is defined as $\omega_2 - \omega_1$, then one may write $$\frac{\omega_c}{\omega_0} = \frac{\omega_0}{\omega_1} - \frac{\omega_1}{\omega_0} \quad (3)$$

Figure 4A:
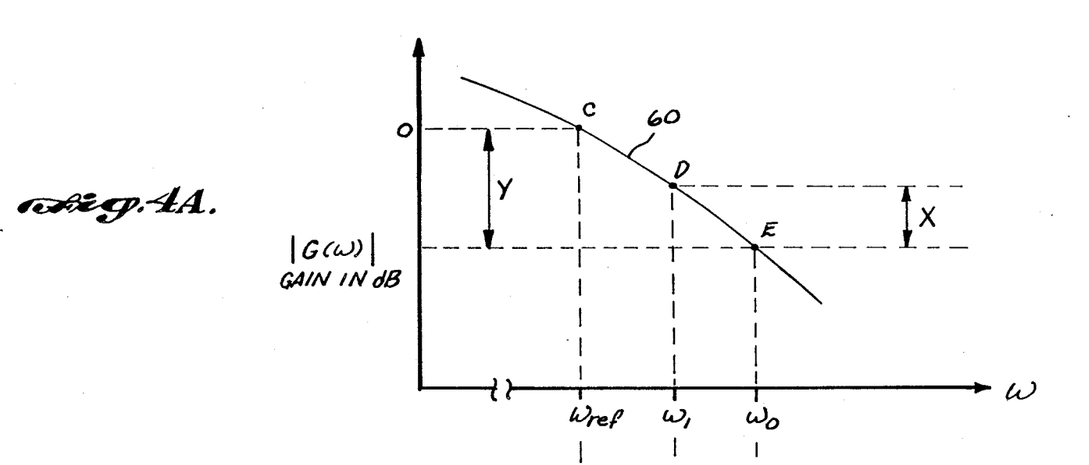
FIGS. 4A and 4B are graphs illustrating derivation of the filter coefficients for the high frequency section.
Figure 4B:
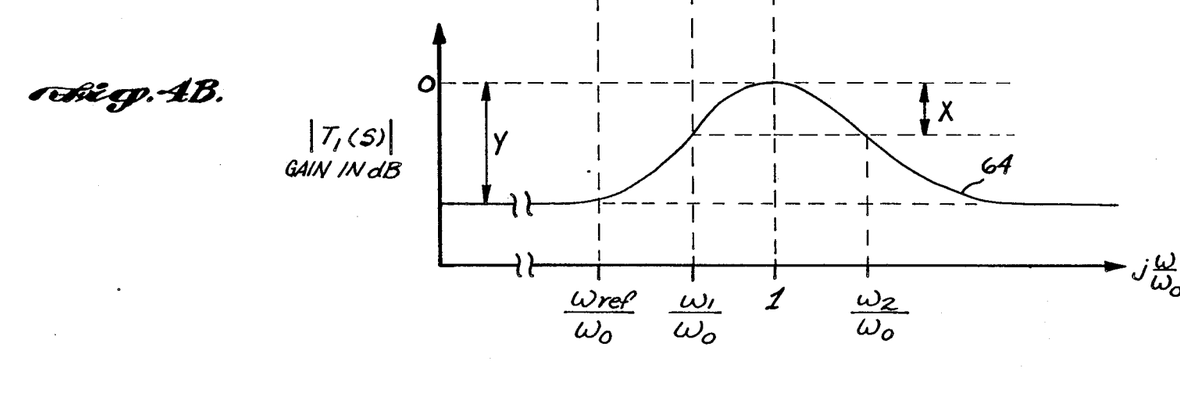

A closed form solution can be found for the coefficients A and B in Equation (1) by first forming the ratios X and Y as follows:

$$X = \left| \frac{T_1(\omega_1)}{T_1(\omega_0)} \right| = \left| \frac{G(\omega_0)}{G(\omega_1)} \right| = |T_1(\omega_1)| \quad (4)$$

$$Y = \left| \frac{T_1(\omega_0)}{T_1(\omega_{ref})} \right| = \left| \frac{G(\omega_{ref})}{G(\omega_0)} \right| \approx \left| \frac{T_1(\omega_0)}{T_1(0)} \right| \quad (5)$$

where the second equality in Equation 4 follows from the normalization condition, i.e., $T_1(\omega_0) = 1$, and where the second equality in Equation 5 is approximate and is based upon the known shape of the biquadratic transfer function. The magnitudes of the X and Y values are indicated graphically in FIGS. 4A and 4B. From Equations 1 and 3-5, one can write $$|T(\omega)|^2 = K^2 \cdot \frac{\left[\frac{\omega_0}{\omega} - \frac{\omega}{\omega_0}\right]^2 + A^2}{\left[\frac{\omega_0}{\omega} - \frac{\omega}{\omega_0}\right]^2 + B^2} \quad (6)$$

from which it follows that $$X^2 = \frac{B^2}{A^2} \cdot \frac{\left(\frac{\omega_c}{\omega_0}\right)^2 + A^2}{\left(\frac{\omega_c}{\omega_0}\right)^2 + B^2} \quad (7)$$

$$Y^2 = \frac{A^2}{B^2} \quad (8)$$

Algebraic manipulation of Equations 7 and 8 then yields the desired closed form solutions:

$$A = \frac{\omega_c}{\omega_0} \sqrt{\frac{X^2 Y^2 - 1}{1 - X^2}} \quad (9)$$

$$B = \frac{A}{Y} \quad (10)$$

Measurement of the unequalized amplitude response at points C, D and E provides values for $G(\omega_{ref})$, $G(\omega_1)$, and $G(\omega_0)$. These measurements can be converted to values for X and Y via Equations 4 and 5, and to filter coefficients A and B per Equations 9 and 10. It is noted that Equation 9 cannot be used if the value of X is 1, or if the argument of the square root function is negative. From the definitions of X and Y, it can be seen that these conditions will arise if the channel requires little equalization, or if the gain of the channel is not monotonically decreasing with frequency in the band of interest. In the former case, no equalization is required. In the latter case, a higher order transfer function must be used to equalize the section, or the band of interest changed.

For the preferred embodiment in which a digital filter is used for amplitude equalization, the digital filter coefficients can then be obtained from the transfer function of FIG. 1 using the well-known billnear transform. The result is a digital filter having the following second order, biquadratic form:

$$H(z) = R \cdot \frac{P + Qz^{-1} + z^{-2}}{M + Nz^{-1} + z^{-2}} \quad (11)$$

with the coefficients R, P, Q, M and N being computed directly from the analog coefficients A and B by methods well known to those skilled in the art. Equation 11 can be directly implemented by a suitable digital signal processor 42 shown in FIG. 2, for example the TMS-320 single chip processor available from Texas Instruments. A significant advantage of the described embodiment is the existence of closed-form solutions for the filter coefficients. This feature permits the coefficients to be easily recalculated, when channel conditions change on the NCTE which contains equalizer circuit 10, by means of a self-contained microprocessor.

Figure 5A:
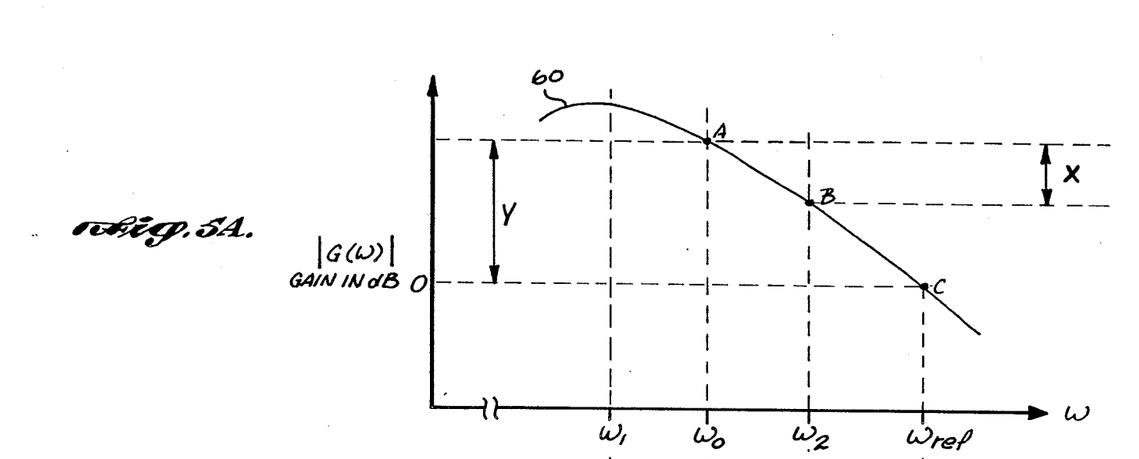
FIGS. 5A and 5B are graphs illustrating the derivation of the filter coefficients for the low frequency section.
Figure 5B:
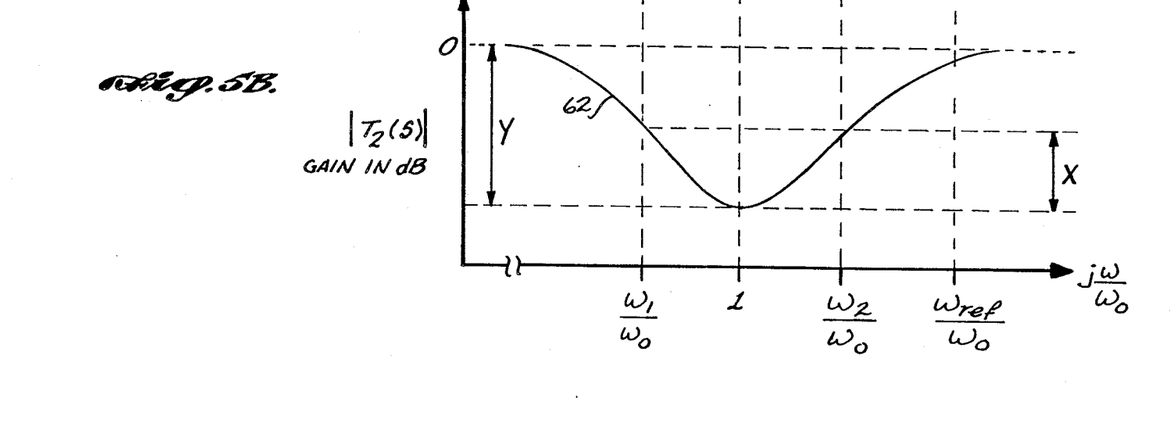

Calculation of the analog transfer function $T_2(s)$ for the low frequency section is illustrated in FIGS. 5A and 5B. The frequencies at points A, B and C are taken to be $\omega_0$, $\omega_2$ and $\omega_{ref}$, and $\omega_1$ and $\omega_c$ are defined such that $\omega_0^2 = \omega_1 \omega_2$ and $\omega_c$ equals $\omega_{2-\omega_1}$. With these definitions, the calculations are nearly similar to those set forth for the upper frequency section, with the following variations:

$$X = \left| \frac{T_2(\omega_0)}{T_2(\omega_2)} \right| = \left| \frac{G(\omega_2)}{G(\omega_0)} \right| \quad (12)$$

$$Y = \left| \frac{T_2(\omega_{ref})}{T_2(\omega_0)} \right| = \left| \frac{G(\omega_0)}{G(\omega_{ref})} \right| \quad (13)$$

From the values of X and Y computed by means of equations (12) and (13), respectively, transfer function $T_2(S)$ is given by equation (14)

$$T_2(S) = K \cdot \frac{S^2 + BS + 1}{S^2 + AS + 1} \quad (14)$$

normalized to $\omega_o$. The coefficients A and B are calculated as before from equations (9) and (10).

As with the $T_1(s)$ section, the billnear transformation is used to transform analog filter coefficients to digital filter coefficients, shown in equation (11), for implementation by digital signal processor 42.

In summary, for each equalizer section used, it is first desired to find a transfer function in the continuous time domain (analog), which can conveniently be a second order function of S ($S = j\omega$) as shown in equation (1). First order functions could be used with less precise equalization capability and higher order functions could be used with increased computational requirements. For the biquadratic transfer function of equation (1), coefficients A and B are computed in a closed form manner which forces nearly exact equalization at two frequencies. Therefore, the magnitude of $T_1(S)$ at points D and E very closely compensates the two corresponding points of $G(\omega)$ in FIG. 3A. Likewise, points A and B of equalizer $T_2(S)$ shown in FIG. 3B very closely compensates the two corresponding points of $G(\omega)$. The resulting equalized response of FIG. 3D will therefore be nearly exact at the 5 frequencies used to measure points A, B, C, D, and E with a certain amount of error at intermediate frequencies.

While preferred embodiments of the invention have been illustrated and described, variations will be apparent to those skilled in the art. Accordingly, the invention is not to be limited to the specific embodiments shown. Rather, the scope of the invention is to be determined by reference to the following claims.

The embodiments of the invention in which an exclusive property or privilege is claimed are defined as follows:

1. A circuit for connection to a signal channel for adaptively amplitude equalizing the signal channel over a predetermined channel frequency range, the circuit comprising:

means for receiving a plurality of alignment signals from the signal channel, each alignment signal being at a predetermined alignment frequency;

means for measuring the amplitude of each alignment signal and for determining filter data based upon the alignment signal amplitudes;

means for storing the filter data; and signal processor means for filtering an input signal present on the channel to produce a filtered output signal, the signal processor means including means for adjusting its amplitude response in response to the filter data stored by said means for storing, such that the combined amplitude response of the signal channel and the signal processor means is substantially flat over said channel frequency range.

2. The circuit of claim 1, wherein the signal processor means implement a second order filter transfer function.

3. The circuit of claim 1, wherein the signal processor means implement a biquadratic filter transfer function.

4. The circuit of claim 3, wherein the biquadratic filter transfer function includes coefficients that are determined such that the combined amplitude response of the signal channel and the signal processor means has a predetermined value at each of the plurality of alignment frequencies.

5. The circuit of claim 4, wherein within said channel frequency range, the biquadratic filter transfer function has an amplitude response that is substantially similar to the amplitude response of an analog filter having a transfer function of the form $$T(s) = K \cdot \frac{s^2 + As + 1}{s^2 + Bs + 1}$$

and wherein the coefficients A and B are computed from the filter data.

6. The circuit of claim 5, further comprising means for receiving an analog signal from the signal channel and means for converting the analog signal into a corresponding series of digital signals, wherein the signal processor means comprise digital filtering means for receiving the series of digital signals and producing a corresponding series of filtered digital signals, and wherein the signal processor means further comprise means for converting the filtered digital signals into the filtered output signal.

7. The circuit of claim 1, wherein the signal processor means comprise digital filter means for producing a flat combined amplitude response over a sub-range of frequencies that at least partially overlaps said channel frequency range.

8. The circuit of claim 7 wherein the digital filter means implement a second order filter transfer function.

9. The circuit of claim 7, wherein the digital filter means implement a biquadratic filter transfer function.

10. The circuit of claim 9, wherein the biquadratic filter transfer function includes coefficients that are determined such that the combined amplitude response of the signal channel and the digital filter means has a predetermined value at the plurality of alignment frequencies.

11. The circuit of claim 10, wherein a single alignment frequency is common to two digital filter sections and their associated sub-ranges.

12. The circuit of claim 10, wherein in each sub-range, the filter transfer function has an amplitude response that is substantially similar to the amplitude response of an analog filter having a transfer function of the form $$T(s) = K \cdot \frac{s^2 + As + 1}{s^2 + Bs + 1}$$

and wherein the coefficients A and B are computed from the filter data for the associated digital filter section.

13. The circuit of claim 12, further comprising means for receiving an analog signal from the signal channel and for converting the analog signal into a correspond series of digital signals, wherein the signal processor means comprise digital filtering means for receiving the series of digital signals and producing a corresponding series of filtered digital signals, and wherein the signal processor means further comprise means for converting the filtered digital signals into the filtered output signal.

14. A method for adaptively amplitude equalizing a signal channel over a predetermined channel frequency range, the method comprising the steps of:
receiving a plurality of alignment signals from the signal channel, each alignment signal being at a predetermined alignment frequency;
measuring the amplitude of each alignment signal and determining filter data based upon the alignment signal amplitudes;
storing the filter data; and
filtering an input signal present on the channel to produce a filtered output signal, and compensating variations in the amplitude response of the signal channel, so that it is substantially flat over said channel frequency range.

15. The method of claim 14, wherein the filtering step includes the step of implementing a second order filter transfer function.

16. The method of claim 14, wherein the filtering step includes the step of implementing a biquadratic filter transfer function.

17. The method of claim 16, wherein the biquadratic filter transfer function includes coefficients that are determined such that the combined amplitude response of the signal channel and the filter means has a predetermined value at each of the plurality of alignment frequencies.

18. The method of claim 17, wherein within said channel frequency range, the biquadratic filter transfer function has an amplitude response that is substantially similar to the amplitude response of an analog filter having a transfer function of the form $$T(s) = K \cdot \frac{s^2 + As + 1}{s^2 + Bs + 1}$$

and wherein the coefficients A and B are computed from the filter data.

19. The method of claim 18, further including the steps of receiving an analog signal from the signal channel, and converting the analog signal into a corresponding series of digital signals, wherein the filtering step includes the steps of digitally filtering the series of digital signals to produce a corresponding series of filtered digital signals, and converting the filtered digital signals into the filtered output signal.

20. The method of claim 4, wherein the filtering step includes the step of producing a flat combined amplitude response over a sub-range of frequencies that at least partially overlaps said channel frequency range in a signal processor.

21. The method of claim 20, wherein the signal processor implements a second order filter transfer function.

22. The method of claim 20, wherein the signal processor implements a biquadratic filter transfer function.

23. The method of claim 22, wherein each biquadratic filter transfer function includes coefficients that are determined such that the combined amplitude response of the signal channel and signal processor has a predetermined value at each of the plurality of alignment frequencies.

24. The method of claim 23, wherein a single alignment frequency is common to two sub-ranges.

25. The method of claim 23, wherein in each sub-range, the filter transfer function has an amplitude response that is substantially similar to the amplitude response of an analog filter having a transfer function of the form $$T(s) = K \cdot \frac{s^2 + As + 1}{s^2 + Bs + 1}$$

and wherein the coefficients A and B are computed from the filter data for the associated sub-range.

26. The method of claim 25, further including the steps of receiving an analog signal from the signal channel, and converting the analog signal into a corresponding series of digital signals, wherein the filtering step includes the steps of digitally filtering the series of digital signals to produce a corresponding series of filtered digital signals, and converting the filtered digital signals into the filtered output signal.

* * * * *

UNITED STATES PATENT AND TRADEMARK OFFICE
CERTIFICATE OF CORRECTION

PATENT NO. : 4,899,365
DATED : February 6, 1990
INVENTOR(S) : Robert G. Hove

It is certified that error appears in the above-identified patent and that said Letters Patent is hereby corrected as shown below:

| Column | Line(s) | Error |
|---|---|---|
| 4 | 29 | "means" should be --measures-- |
| 5 | 49 | after "high" insert --frequency section is illustrated in FIGURES 4A and 4B. The radian-- |
| 5 | 67 | "$\omega$hd 2" should be --$\omega_2$-- |
| 7 | 4 | "billnear" should be --bilinear-- |
| 7 | 27 | "$\omega_2 - \omega 1$" should be --$\omega_2 - \omega_1$-- |
| 7 | 48 | "billnear" should be --bilinear-- |
| 9 | 28 | "correspond" should be --corresponding-- |
| 10 | 22 | "4" should be --14-- |

Signed and Sealed this

Twenty-fourth Day of September, 1991

Attest:

HARRY F. MANBECK, JR.

*Attesting Officer*    Commissioner of Patents and Trademarks